(12) United States Patent
Stretton et al.

(10) Patent No.: US 7,398,641 B2
(45) Date of Patent: Jul. 15, 2008

(54) AEROENGINE INTAKE HAVING A HEAT EXCHANGER WITHIN AN ANNULAR CLOSED CHAMBER

(75) Inventors: Richard G Stretton, Loughborough (GB); Peter Beardsley, Derby (GB)

(73) Assignee: Rolls-Royce plc, London (GB)

( * ) Notice: Subject to any disclaimer, the term of this patent is extended or adjusted under 35 U.S.C. 154(b) by 849 days.

(21) Appl. No.: 10/837,715

(22) Filed: May 4, 2004

(65) Prior Publication Data
US 2005/0150204 A1    Jul. 14, 2005

(30) Foreign Application Priority Data
May 21, 2003  (GB)  ................... 0311663.9

(51) Int. Cl.
*F02G 3/00*     (2006.01)
(52) U.S. Cl. ................ 60/39.093; 244/134 R; 244/134 B; 60/266
(58) Field of Classification Search ............... 60/39.83, 60/39.093, 266; 137/15.1; 244/134 R–134 F; 123/41.2
See application file for complete search history.

(56) References Cited

U.S. PATENT DOCUMENTS

| 2,435,990 | A |   | 2/1948  | Weiler |
| 2,594,118 | A |   | 4/1952  | Boyd |
| 2,712,727 | A | * | 7/1955  | William et al. ........... 60/39.093 |
| 3,981,466 | A | * | 9/1976  | Shah ...................... 244/134 R |
| 4,688,394 | A | * | 8/1987  | Waldorf ....................... 62/243 |
| 4,688,745 | A |   | 8/1987  | Rosenthal |
| 4,782,658 | A |   | 11/1988 | Perry |
| 4,791,782 | A | * | 12/1988 | Seed ......................... 60/226.1 |
| 6,131,855 | A |   | 10/2000 | Porte |

FOREIGN PATENT DOCUMENTS

GB            2136880 A    9/1984

* cited by examiner

*Primary Examiner*—William H. Rodriguez
*Assistant Examiner*—Andrew Nguyen
(74) *Attorney, Agent, or Firm*—W. Warren Taltavull; Manelli Denison & Selter PLLC

(57) ABSTRACT

A gas turbine engine comprising a nacelle having an intake, the intake defining a generally annular chamber, an engine accessory and a heat exchanger for cooling a fluid of the accessory. The chamber is closed and the heat exchanger is disposed within the chamber operable to provide heat to prevent ice forming on the intake during engine operation.

11 Claims, 3 Drawing Sheets

AEROENGINE INTAKE HAVING A HEAT EXCHANGER WITHIN AN ANNULAR CLOSED CHAMBER

TITLE OF THE INVENTION

1. Field of the Invention

The present invention relates to an intake of an aeroengine nacelle and in particular to providing a heated intake for prevention of ice build up thereon.

2. Background of the Invention

The leading edge of the intake of aeroengines is particularly prone to icing during flight through clouds containing super-cooled water droplets or ground operation in freezing fog. Protection against ice formation may be required since icing of the intake may significantly affect the airflow through the engine, causing a loss of performance and possible malfunction of the engine. In addition, damage may result from ice breaking away and being ingested into the engine or impacting acoustic liners around the intake duct.

It is well known to provide the intake with an electrical element heating system, ducting to supply the intake with heated core engine air or piping to supply hot engine oil around to the intake prevent ice build up. Embodiments of these systems are disclosed in "The Jet Engine", Rolls-Royce Plc, 1986, ISBN 0902121235.

Electrical heating systems require a substantial input of electricity, which is generated by an auxiliary power unit, as known in the art. Such a system inefficient as it requires additional electrical generation. Current heated air anti-ice systems require substantial ducting and control equipment to bleed air from the core engine only when anti-icing measures are required. These systems are disadvantaged in that they use air bled from the compressor thereby reducing engine efficiency. As both these systems impose significant engine power requirements both use either pilot or control input to switch on the anti-icing devices.

GB2136880 relates to a turbo-prop engine where heat from a reduction gearbox is transferred by conduction through the engine casing to the intake lip. An annular air intake comprises a number of stator vanes having heat pipes therethrough connecting the interior of the reduction gearbox with a heat sink situated adjacent the upstream lip of the intake. Heat from the hot oil mist within the gearbox is thus conducted to the heat sink and serves to heat up the intake lip to prevent the formation of ice thereon, while at the same time the oil mist is cooled. As this system employs engine oil, failure of the system is likely to compromise engine operability. A further problem is that the heat sink and piping imposes a significant weight penalty to the engine and nacelle assembly.

GB2204361 discloses the transfer of hot oil from a reduction gearbox to a heat exchanger and with an air scoop that directs external air through the heat exchanger and then the warmed air is used to de-ice the intake. However, a serious disadvantage with this arrangement is that the air scoop causes additional aerodynamic drag, therefore reducing the overall efficiency of the engine.

Therefore it is an object of the present invention to provide an anti-icing system for at least the intake of a gas turbine engine that does not cause an aerodynamic drag, does not use engine oil or air bled from a compressor and is a closed system.

SUMMARY OF THE INVENTION

In accordance with the present invention a gas turbine engine is provided that comprises a nacelle having an intake, the intake defining a generally annular chamber, an engine accessory and a heat exchanger for cooling a fluid of the accessory characterised in that the chamber is closed and the heat exchanger is disposed within the chamber operable to provide heat to prevent ice forming on the intake during engine operation.

Preferably, a means for circulating air around the chamber and driving the air through the heat exchanger is provided within the chamber and the means for circulating air comprising at least one electrically driven fan.

Preferably, the accessory is a generator operable to generate electricity during engine operation.

Alternatively, the accessory is a starter/generator operable to drive the engine at start up and generate electricity during engine operation.

Alternatively, the accessory is a gearbox for transferring drive between an engine shaft and the accessory.

Preferably, a second heat exchanger is included in the chamber and associated to a second accessory.

Preferably, the intake comprises at least one rib extending substantially around the circumference of and into the chamber.

Preferably, the at least one rib increases in extent into the chamber generally from the heat exchanger thereby increasing its surface area for heat exchanging to provide a more constant heat exchange around the circumference of the intake.

Alternatively, further ribs are provided around the circumference to increase the surface area for heat exchanging around the intake to provide a more constant heat exchange around the circumference of the intake.

Preferably, the ribs also provide increased rigidity of the intake to protect against foreign body impacts.

Furthermore and in accordance with the present invention there is provided an intake for a gas turbine engine, the intake defining a generally annular chamber and capable of housing an engine accessory and a heat exchanger capable of cooling a fluid of the accessory characterised in that the chamber is closed and the heat exchanger operable to provide heat to the intake.

BRIEF DESCRIPTION OF THE DRAWINGS

The present invention will be more fully described by way of example with reference to the accompanying drawings in which.

DETAILED DESCRIPTION OF THE INVENTION

Figure 1:
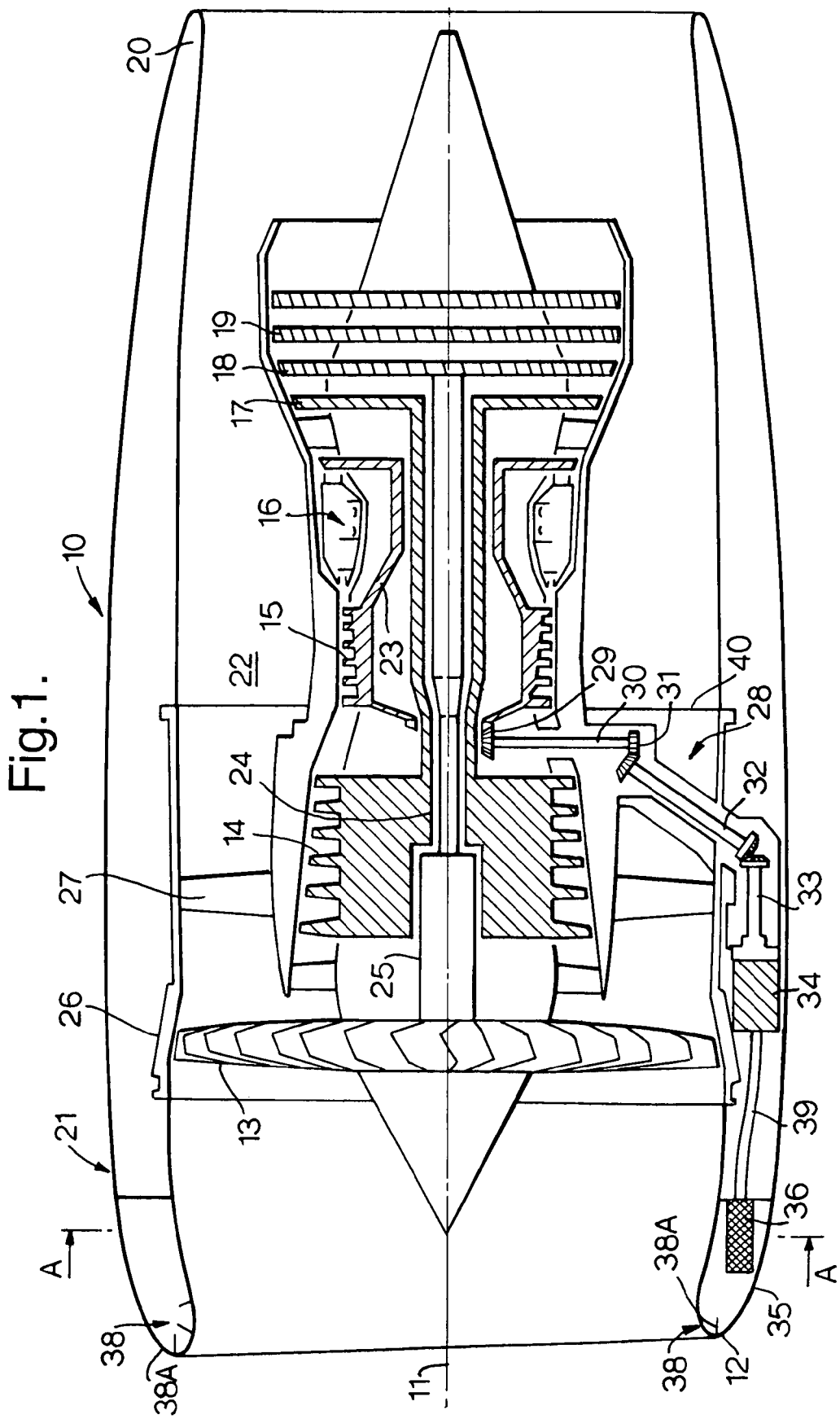
FIG. 1 is a schematic section of part of a ducted fan gas turbine engine incorporating the present invention.
Figure 2:
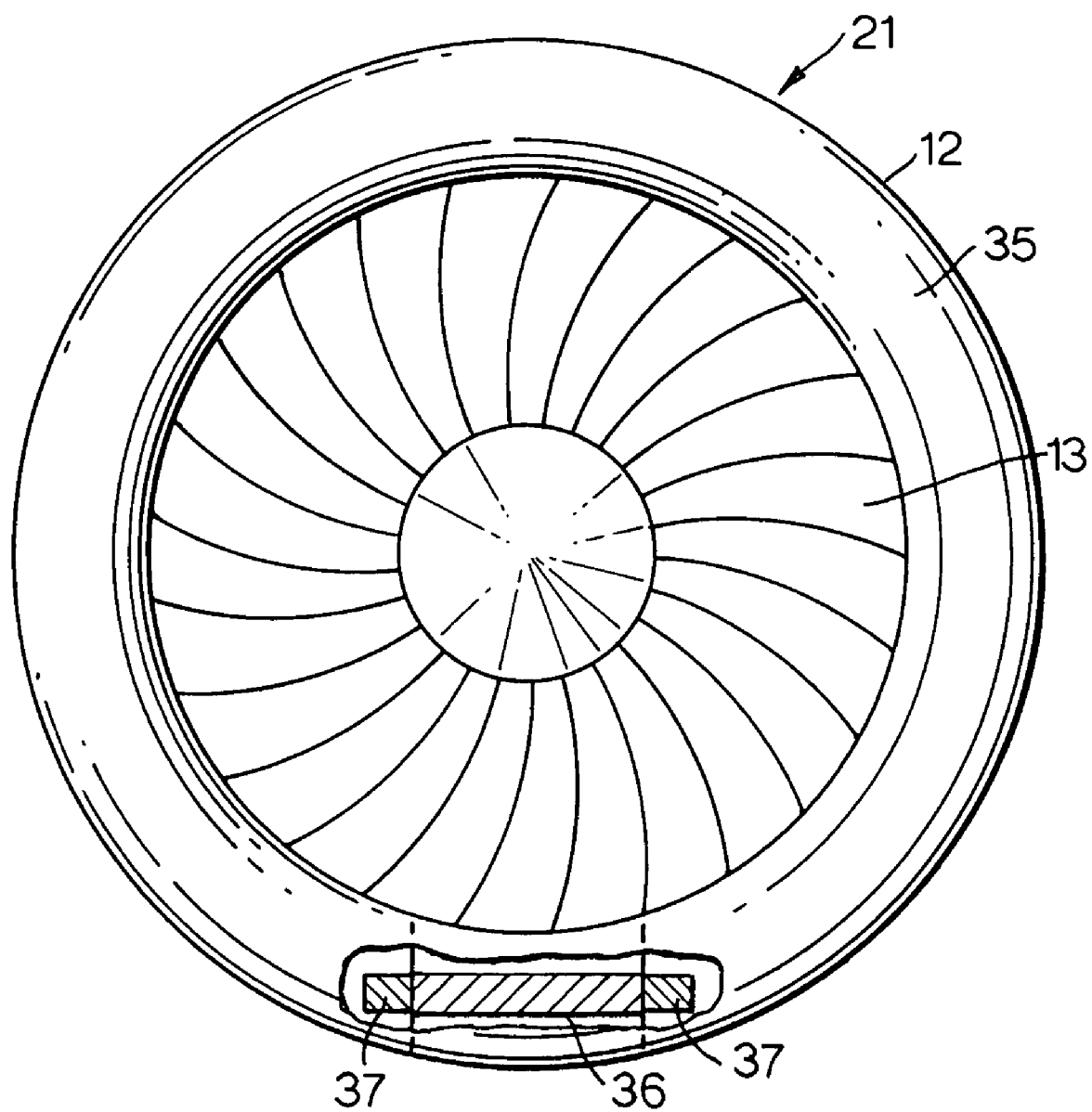
FIG. 2 is a view on section A-A of FIG. 1.

With reference to FIGS. 1 and 2, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 11 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts 23, 24, 25.

The fan 13 is circumferentially surrounded by a structural member in the form of a fan casing 26, which is supported by an annular array of outlet guide vanes 27.

The engine 10 further comprises a gearbox/generator assembly 28 used for engine start up and for generating electricity once the engine has been started and working in convention fashion. The generated electricity is used for engine and associated aircraft electrical accessories as well known in the art. The gearbox/generator assembly 28 is drivingly connected to the high-pressure shaft 24, however, in other embodiments may be driven by any one or more of the shafts 24, 25. In this embodiment, the gearbox/generator assembly 28 comprises an internal gearbox 29 connecting a first drive shaft 30 to the high-pressure shaft 23, an intermediate gearbox 31 connecting the first drive shaft 30 to a second drive shaft 32 and an external gearbox 33 drivingly connected to the second drive shaft 32. The external gearbox 33 is drivingly connected to a generator 34 that is capable of the aforesaid engine operation. The generator 34 and external gearbox 33 are housed within the nacelle 21. The first drive shaft 30, intermediate gearbox 31 and the second drive shaft 32 are housed within a bypass duct splitter fairing 40.

The nacelle 21 comprises the intake 12 at its forward end; the intake 12 defines a generally D-shaped and generally annular chamber 35. An oil heat exchanger 36, which serves to cool the oil used in the generator 34 and gearbox 33, is located in the chamber 35. A pipe 39 fluidly connects the heat exchanger 36 to the generator 34. It should be appreciated by those skilled in the art, that any suitable heat exchanger 36 is usable. The present invention relates to the positioning of the heat exchanger 36 in the D-shaped chamber 35 and that the chamber 35 is closed. The air inside the chamber 35 is circulated, removing heat from the oil in the heat exchanger 36 and distributing the heat around the chamber 35 to heat the intake 12 and thereby prevent ice-build up on the intake 12. A means for circulating air 37 and driving the air through the heat exchanger 36 is provided in the form of an electrically driven fan 37, however, more than one fan 37 may be provided in the chamber 35. Other means for driving the fan 37 may be employed, such as, using pressurised oil or air.

The present invention is particularly advantageous in that the heat exchanger 36 is located within the intake 12 meaning no additional pipe work or ducting is required for transferring heated air to the intake 12. A second advantage is present in that the arrangement is a closed system i.e. there is no external air scoop to feed air into the heat exchanger and therefore no aero drag penalty. Furthermore the chamber 35 circulating air is not vented overboard that would otherwise cause an aerodynamic drag penalty. A further advantage is that the generator oil is used as the heat source as opposed to engine oil. Hence impact and subsequent damage from a foreign object, such as a bird, would not be critical to continued engine 10 operation.

Importantly, the present invention provides an anti-icing system that is always active so there is no requirement for pilot interaction or electronic control.

Figure 4:
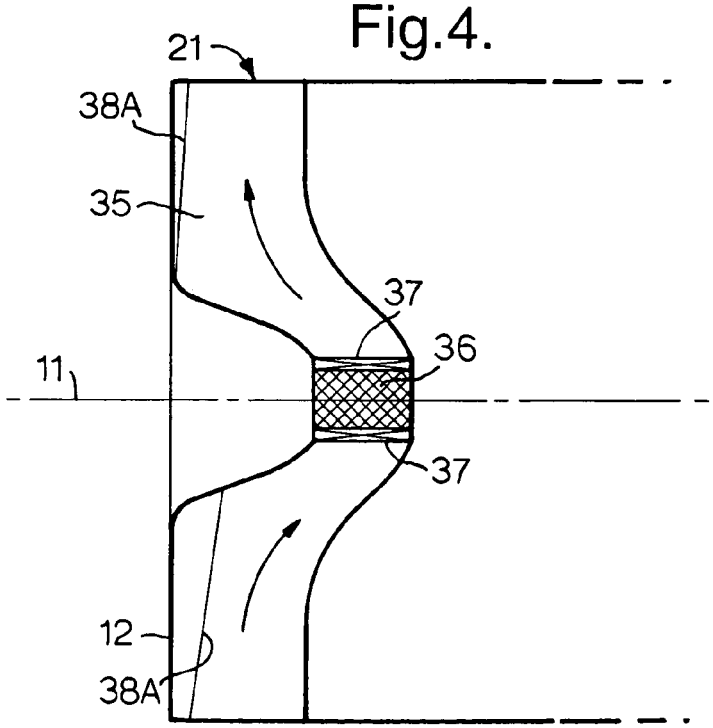
FIG. 4 is a view on arrow B of FIG. 3.

To assist in transferring heat to the intake 12 the inner surface of the intake 12 comprises a means for heat exchange 38 between the air circulating within the chamber 35 and the walls of the intake 12. In this embodiment the means for heat exchange 38 comprises a plurality of generally annular extending ribs 38 that also extend from the inner walls of the intake 12 into the chamber 35. It should be appreciated that the ribs 38 may take many different forms to provide heat exchange and as such all provide the essential function of transferring heat from the circulating air to the intake 12 to prevent ice build up and to provide a relatively cool air supply to the heat exchanger 36. As the heated air is circulated around the chamber 35 it reduces in temperature, so to provide a more even distribution of heat around the intake, the ribs 38 generally increase in number from the outlet of the heat exchanger to its inlet. Alternatively and as shown in FIG. 4, each rib 38A increases in height and thus surface area to accommodate and increase heat transfer of the reduction in air temperature around the intake 12 from the outlet of the heat exchanger to its inlet. The inclusion of ribs 38 further enhances the strength of the intake 12 and reduces the damage caused by a foreign object striking the intake 12.

The present invention provides further advantages over the prior art in that the prior art engine comprises a thermal anti-ice pipe and outlet duct that are omitted in the arrangement of the present invention thereby giving an improved weight saving and improved arrangement of the engine's remaining piping and other accessories. Prior art systems supply hot engine core air to a D-shaped chamber at the front of the intakes via a large pressurised duct. In the event of duct rupture the nacelle fan cowl doors are protected from failure either by a pressure relief door or a double walled pressurised pipe. The present invention eliminates the requirement for these additional features. The space taken up by conventional cooler scoops in the rear fancase can provide additional acoustic lining. This also provides a performance advantage since bypass air not lost overboard and core air not lost for anti ice purposes.

In a further embodiment of the present invention, the accessory (33, 34) is a starter/generator (36) that is operable to drive the engine (10) at start up and generate electricity during engine (10) operation.

Figure 3:
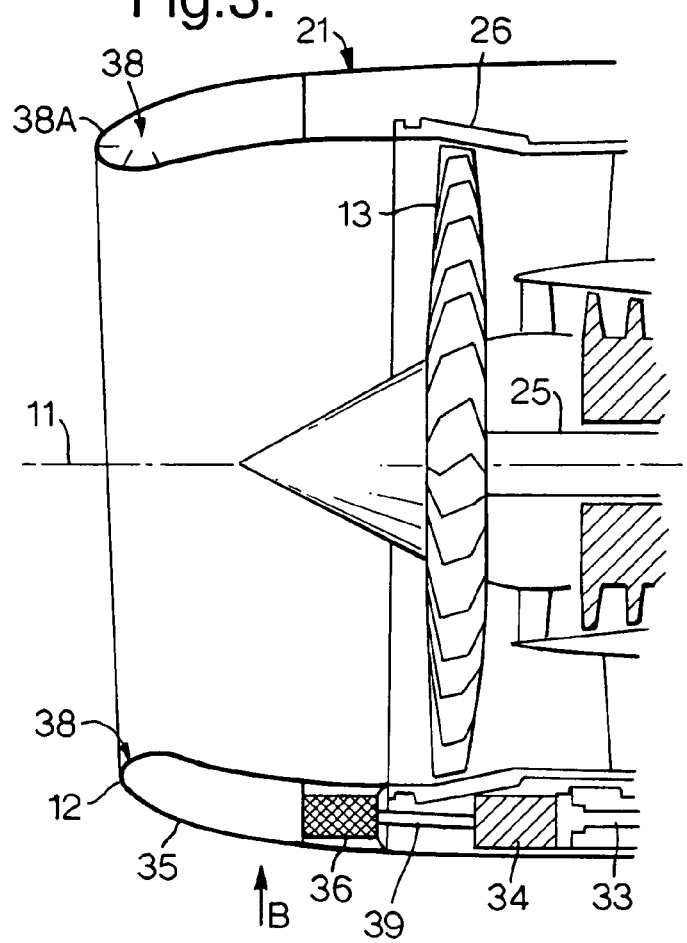
FIG. 3 is a schematic section of part of a ducted fan gas turbine engine incorporating the present invention.

FIGS. 3 and 4 show the heat exchanger 36 and the fans 37 further rearward in the chamber 35. This is a preferable configuration where the heat exchanger 36 is significantly heavy and is required to be moved rearward to reduce the bending moment about the outlet guide vanes 27. As can be seen, the chamber 35 is curved axially and locally to meet and supply cooling air through the heat exchanger 36.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A gas turbine engine comprising a nacelle having an intake, the intake defining a generally annular chamber, an engine accessory and a heat exchanger for cooling a fluid of the accessory characterised in that the chamber is closed and the heat exchanger is disposed within the chamber operable to provide heat to prevent ice forming on the intake during engine operation.

2. A gas turbine engine as claimed in claim 1 wherein a means for circulating air around the chamber and driving the air through the heat exchanger is provided within the chamber.

3. A gas turbine engine as claimed in claim 2 wherein the means for circulating air comprises at least one electrically driven fan.

4. A gas turbine engine as ctaimed in claim 1 wherein the accessory is a generator operable to generate electricity during engine operation.

5. A gas turbine engine as claimed in claim 1 wherein the accessory is a starter/generator operable to drive the engine at start up and generate electricity during engine operation.

6. A gas turbine engine as claimed in claim 1 wherein the accessory is a gearbox for transferring drive between an engine shaft and the accessory.

7. A gas turbine engine as claimed in claim 1 wherein a second heat exchanger is included in the chamber and associated to a second accessory.

8. A gas turbine engine as claimed in claim 1 wherein the intake comprises at least one rib extending substantially around the circumference of and into the chamber.

9. A gas turbine engine as claimed in claim 8 wherein the at least one rib increases in extent into the chamber generally from the heat exchanger thereby increasing its surface area for heat exchanging to provide a more constant heat exchange around the circumference of the intake.

10. A gas turbine engine as claimed in claim 8 wherein further ribs are provided around the circumference to increase the surface area for heat exchanging around the intake to provide a more constant heat exchange around the circumference of the intake.

11. A gas turbine engine as claimed in claim 8 wherein the ribs are provided to increase the rigidity of the intake to protect against foreign body impacts.

* * * * *